US012597401B2

(12) United States Patent
Chen et al.

(10) Patent No.: US 12,597,401 B2
(45) Date of Patent: Apr. 7, 2026

(54) CHOLESTERIC LIQUID CRYSTAL DISPLAY DEVICE WITH TIMING CONTROLLING SOFTWARE

(71) Applicant: GENETOUCH CORP., Taoyuan City (TW)

(72) Inventors: Cheng Yu Chen, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/206,916

(22) Filed: May 13, 2025

(65) Prior Publication Data

US 2025/0391387 A1      Dec. 25, 2025

(30) Foreign Application Priority Data

Jun. 19, 2024    (TW) ................................. 113122613

(51) Int. Cl.
*G09G 3/36* (2006.01)
*G02F 1/137* (2006.01)

(52) U.S. Cl.
CPC ....... *G09G 3/3696* (2013.01); *G02F 1/13718* (2013.01); *G09G 3/3674* (2013.01); *G09G 3/3685* (2013.01); *G09G 2310/08* (2013.01); *G09G 2330/021* (2013.01)

(58) Field of Classification Search
CPC .. G09G 3/3696; G09G 3/3674; G09G 3/3685; G09G 2310/08; G09G 2330/021; G02F 1/13718
See application file for complete search history.

(56) References Cited

U.S. PATENT DOCUMENTS

| | | | |
|---|---|---|---|
| 2008/0001894 A1* | 1/2008 | Oh ....................... | G09G 3/3677 345/98 |
| 2012/0081413 A1* | 4/2012 | Nose .................... | G09G 3/2014 345/212 |
| 2021/0012711 A1* | 1/2021 | Huang ................. | G09G 3/3291 |

FOREIGN PATENT DOCUMENTS

| | | |
|---|---|---|
| CN | 113948047 A | 1/2022 |
| TW | 200830267 A | 7/2008 |
| TW | 201232510 A | 8/2012 |

* cited by examiner

*Primary Examiner* — Chanh D Nguyen
*Assistant Examiner* — Gloryvid Figueroa-Gibson
(74) *Attorney, Agent, or Firm* — Birch, Stewart, Kolasch & Birch, LLP

(57) ABSTRACT

A cholesteric liquid crystal display (ChLCD) device comprises a ChLCD panel, a power supply module, and a system on a chip (SoC). A timing controlling software in the SoC is electrically connected to the power supply module as well as a scan driver and a data driver of the ChLCD panel. The timing controlling software configures and controls the power supply module to output a first to fourth voltage amplitude respectively from a first to fourth channel. The timing controlling software generates and outputs a voltage configuration command to the power supply module. According to the voltage configuration command and the first to the fourth voltage amplitudes, the power supply module generates a reset voltage needed across pixel electrodes for resetting the ChLCD panel and generates a display voltage needed across the pixel electrodes for displaying a frame. The ChLCD device more time efficiently refreshes the frame.

20 Claims, 13 Drawing Sheets

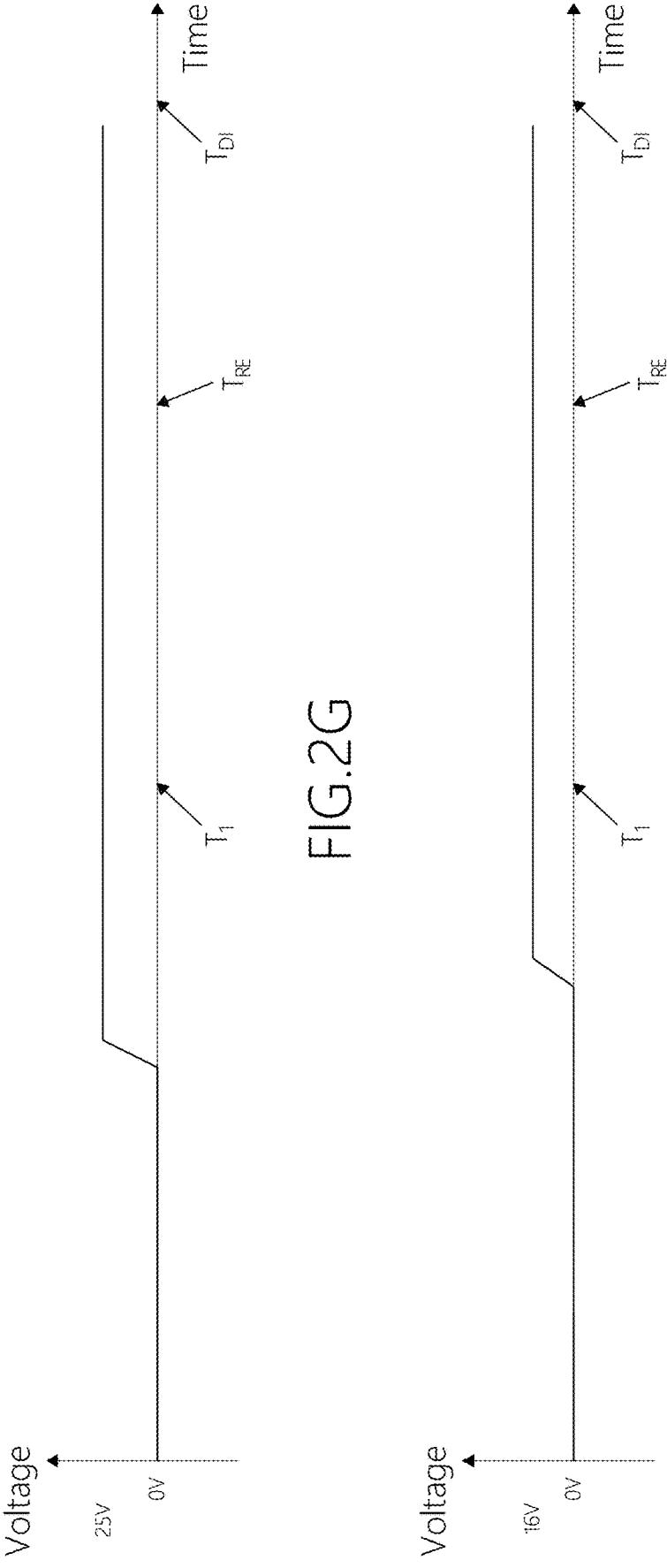

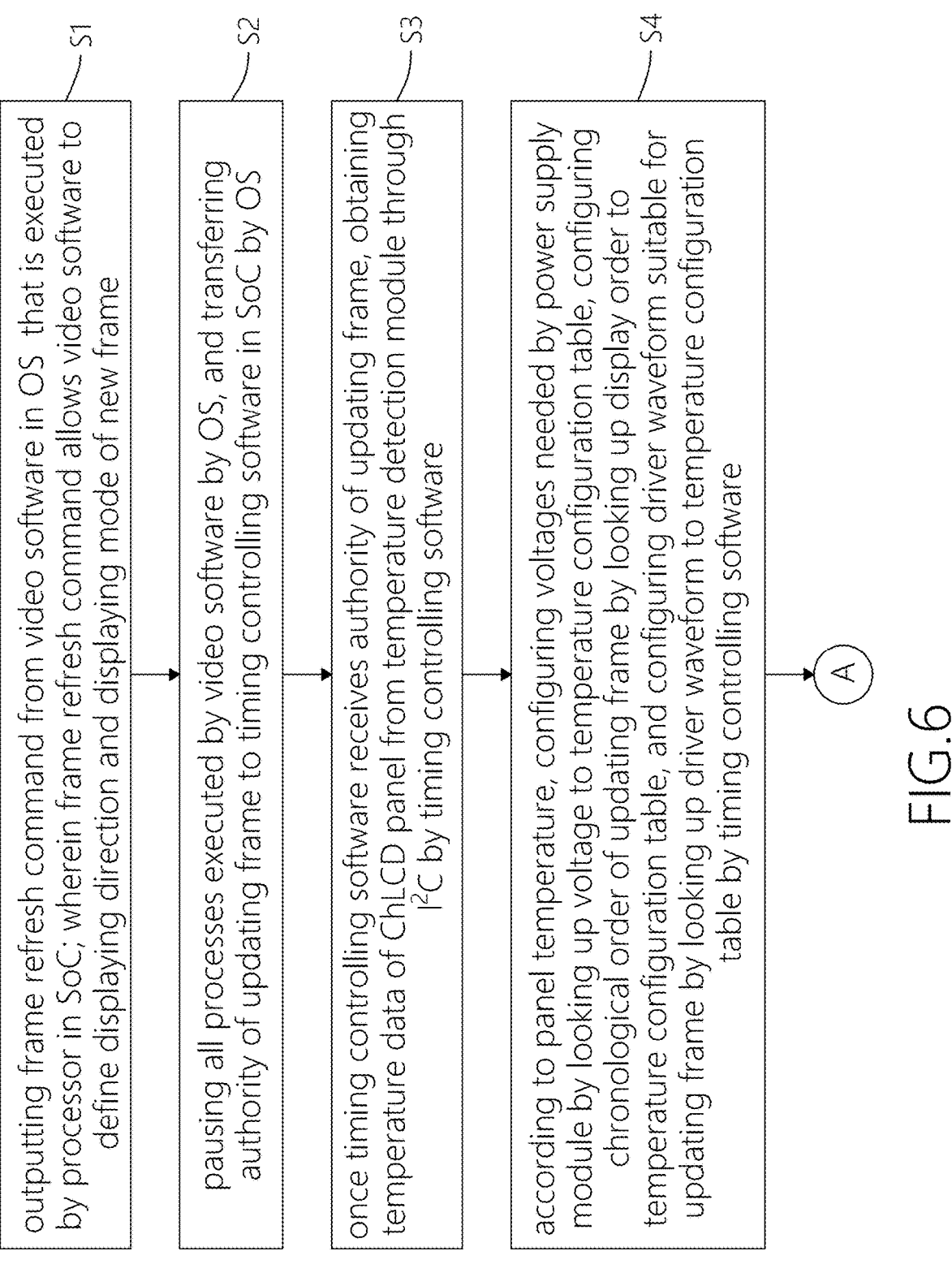

outputting frame refresh command from video software in OS that is executed by processor in SoC; wherein frame refresh command allows video software to define displaying direction and displaying mode of new frame     S1 pausing all processes executed by video software by OS, and transferring authority of updating frame to timing controlling software in SoC by OS     S2 once timing controlling software receives authority of updating frame, obtaining temperature data of ChLCD panel from temperature detection module through I²C by timing controlling software     S3 according to panel temperature, configuring voltages needed by power supply module by looking up voltage to temperature configuration table, configuring chronological order of updating frame by looking up display order to temperature configuration table, and configuring driver waveform suitable for updating frame by looking up driver waveform to temperature configuration table by timing controlling software     S4

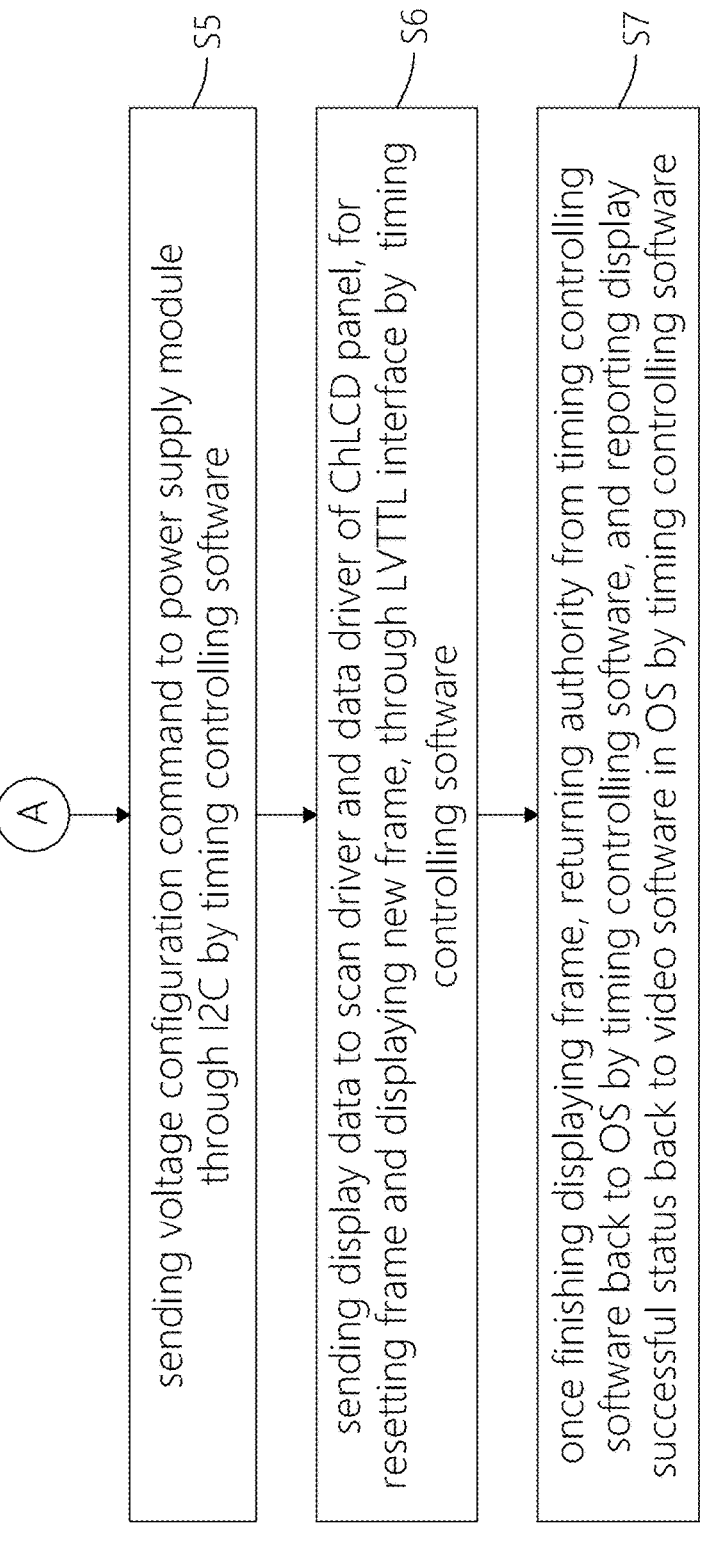

sending voltage configuration command to power supply module through I2C by timing controlling software — S5 sending display data to scan driver and data driver of ChLCD panel, for resetting frame and displaying new frame, through LVTTL interface by timing controlling software — S6 once finishing displaying frame, returning authority from timing controlling software back to OS by timing controlling software, and reporting display successful status back to video software in OS by timing controlling software — S7

FIG.7

CHOLESTERIC LIQUID CRYSTAL DISPLAY DEVICE WITH TIMING CONTROLLING SOFTWARE

CROSS-REFERENCE TO RELATED APPLICATION(S)

This application claims the priority benefit of TW application serial No. 113122613 filed on Jun. 19, 2024, the entirety of which is hereby incorporated by reference herein and made a part of the specification.

BACKGROUND OF THE INVENTION

1. Field of the Invention

The present invention relates to a cholesteric liquid crystal display, more particularly a cholesteric liquid crystal display device with timing controlling software.

2. Description of the Related Art

A conventional cholesteric liquid crystal display (ChLCD) has bistable liquid crystal properties, and therefore, in the technical field of the conventional ChLCD, the conventional ChLCD needs to reset the data of each pixel between displaying different frames. To reset the pixels, the conventional ChLCD needs to supply sufficiently significant voltage differences across each pair of pixel electrodes, thus generating strong enough electric fields to realign the bistable liquid crystals to an original state before displaying any pixel data. More particularly, in both technical fields of an active matrix cholesteric liquid crystal display (AM-ChLCD) and a passive matrix cholesteric liquid crystal display (PMChLCD), regardless of having a thin-film transistor (TFT) to actively control the switching of each of the pixels or not, a ChLCD may not avoid the need of resetting the pixels between displaying different frames.

In order to reset the pixels and subsequently display a video data, the conventional ChLCD relies on a processor, such as a system on a chip (SoC), to send the video data to a timing controller. The timing controller configures a chronological order of a supply voltage of a power supply according to the video data. Once the power supply is configured by the timing controller, the power supply thus starts supplying voltages to the conventional ChLCD, thus allowing the conventional ChLCD to reset the pixels and subsequently display the video data.

The timing controller, however, is a piece of hardware that is bulky in size, and the timing controller also requires a certain designing and manufacturing cost. As a result, a manufacturer of the ChLCD cannot avoid having to deal with the physical size and the manufacturing cost of the timing controller.

Furthermore, regardless of when the conventional ChLCD either resets the pixels or displays the video data, the timing controller would repeatedly configure voltages for the power supply that is working in conjunction with the conventional ChLCD. The repeated action of configuring voltages for the power supply is inefficient and time-consuming, thus the repeated action of configuring voltages prolonged a time the conventional ChLCD takes to update frames, thus limiting a refresh rate of the conventional ChLCD.

With references to FIG. 8A and FIG. 8B, vertical axes represent voltages in units of volts (V), and the horizontal axes represent time in units of milliseconds (ms). When a timing controller is about to help reset the conventional ChLCD, the timing controller sends out series of commands to the power supply, such as a first command signal $V_{S1}$ shown in FIG. 8A. The action of configuring voltages for the power supply and for the power supply to output voltage consumes a first configuration time $T_{S1}$. Once the power supply receives the first command signal $V_{S1}$, the power supply configures voltages of each power output channel according to chronological time points in a pulse train of the first command signal $V_{S1}$, and then outputs the voltages to the conventional ChLCD through the power output channels. As the conventional ChLCD receives various voltages from the power supply, the conventional ChLCD generates different voltages across each cholesteric liquid crystals within, thus generating a reset voltage VR shown in FIG. 8B. To generate the reset voltage VR, an output reset voltage time $T_R$ is required.

Once the conventional ChLCD has reset, in order to control the conventional ChLCD for displaying the video data in a new frame, the timing controller sends out another series of command, such as a second command signal $V_{S2}$ shown in FIG. 8A, to the power supply. This action of configuring the power supply and for the power supply to output a new set of voltages consumes a second configuration time $T_{S2}$. Once the power supply receives the second configuration time $T_{S2}$, the power supply again configures voltages of each power output channels and outputs the voltages to the conventional ChLCD through the power output channels. As the conventional ChLCD receives various voltages from the power supply, the conventional ChLCD again generates different voltages across each cholesteric liquid crystal within, thus generating a display voltage $V_D$ shown in FIG. 8B. To generate the display voltage $V_D$, an output display voltage time TD is required.

Evidently, in order to refresh a new frame, the conventional ChLCD needs to consume a total time of adding the first configuration time $T_{S1}$, the output reset voltage time $T_R$, the second configuration time $T_{S2}$, and the output display voltage time TD. Apart from the output reset voltage time $T_R$ and the output display voltage time TD being unavoidable in the technical field of ChLCD, currently the conventional ChLCD consumes the first configuration time $T_{S1}$ and the second configuration time $T_{S2}$ for refreshing each frame. By having to configure voltages of the power supply twice for each frame, the conventional ChLCD is not efficiently refreshing frames.

SUMMARY OF THE INVENTION

To overcome the aforementioned problems, the present invention provides a cholesteric liquid crystal display device with timing controlling software. By replacing the timing controller with the timing controlling software that is executed by an already existing SoC, the present invention is able to save the designing and manufacturing cost of the timing controller and free the physical spaces occupied by the timing controller. Moreover, the present invention improves how the timing controlling software and a power supply module drive the cholesteric liquid crystal display device, so as to speed up a refresh rate of frames for the cholesteric liquid crystal display device. In other words, the cholesteric liquid crystal display device of the present invention is able to display each of the frames more time efficiently.

The cholesteric liquid crystal display device with the timing controlling software includes:

a cholesteric liquid crystal display (ChLCD) panel, including a scan driver, a data driver, and a plurality of pixel electrodes electrically connecting between the scan driver and the data driver;

a power supply module, including a first channel, a second channel, a third channel, and a fourth channel; wherein the first channel, the second channel, and the fourth channel are electrically connected to the scan driver of the ChLCD panel; and the first channel, the third channel, and the fourth channel are electrically connected to the data driver of the ChLCD panel; and a system on a chip (SOC), including the timing controlling software, and electrically connected to the power supply module, the scan driver of the ChLCD panel, and the data driver of the ChLCD panel;

wherein the timing controlling software configures and controls the power supply module to output a first voltage amplitude from the first channel, to output a second voltage amplitude from the second channel, to output a third voltage amplitude from the third channel, and to output a fourth voltage amplitude from the fourth channel; wherein the fourth voltage amplitude is greater than the third voltage amplitude, the third voltage amplitude is greater than the second voltage amplitude, and the second voltage amplitude is greater than the first voltage amplitude;

wherein the timing controlling software generates a voltage configuration command according to a video signal and outputs the voltage configuration command to the power supply module; wherein according to the voltage configuration command and the first to the fourth voltage amplitudes, the power supply module generates a reset voltage needed across the pixel electrodes for resetting the ChLCD panel and generates a display voltage needed across the pixel electrodes for displaying a frame.

The timing controlling software only once configures the power supply module to output the first to the fourth voltage amplitudes respectively from the first to the fourth channels. Subsequently, whenever the ChLCD panel refreshes for a new frame, the timing controlling software is able to directly generate different voltages across the pixel electrodes of the ChLCD panel according to the first to the fourth voltage amplitudes, all without a need for adjusting any voltage amplitudes with the power supply module. As such, when the pixel electrodes of the ChLCD panel are updated, i.e. for resetting the pixel electrodes and displaying the new frame for the pixel electrodes, the cholesteric liquid crystal display device with the timing controlling software only needed the timing controlling software to generate the voltage configuration command once for adjusting voltages across the pixel electrodes.

A conventional cholesteric liquid crystal display (ChLCD) needs to consume two separate times commanding a power supply for updating each frame—with once commanding the power supply to output a voltage needed for resetting the pixel electrodes, and with once commanding the power supply to output another voltage needed for displaying the new frame. In comparison, since the present invention already once configures the power supply module to generate the various voltage amplitudes, subsequently, for updating each frame, the timing controlling software only needs to consume time once for both resetting the pixel electrodes and displaying the new frame. As a result, the present invention not only saves costs by avoiding using a timing controller, but also is able to more efficiently and more flexibly use the timing controlling software to control the power supply module and the ChLCD panel to update the pixel electrodes for displaying new frames.

BRIEF DESCRIPTION OF THE DRAWINGS

FIG. 2C is a signal perspective view of a power supply module of the cholesteric liquid crystal display device of the present invention, generating a fourth low voltage signal.

FIG. 2D is a signal perspective view of the power supply module of the cholesteric liquid crystal display device of the present invention, generating a third low voltage signal.

FIG. 2G is a signal perspective view of the power supply module of the cholesteric liquid crystal display device of the present invention, generating a fourth high voltage signal.

FIG. 2H is a signal perspective view of the power supply module of the cholesteric liquid crystal display device of the present invention, generating a third high voltage signal.

FIG. 6 is a flow chart of the cholesteric liquid crystal display device updating a frame in an embodiment of the present invention.

FIG. 7 is another flow chart of the cholesteric liquid crystal display device updating the frame in an embodiment of the present invention.

DETAILED DESCRIPTION OF THE INVENTION

Figure 1:
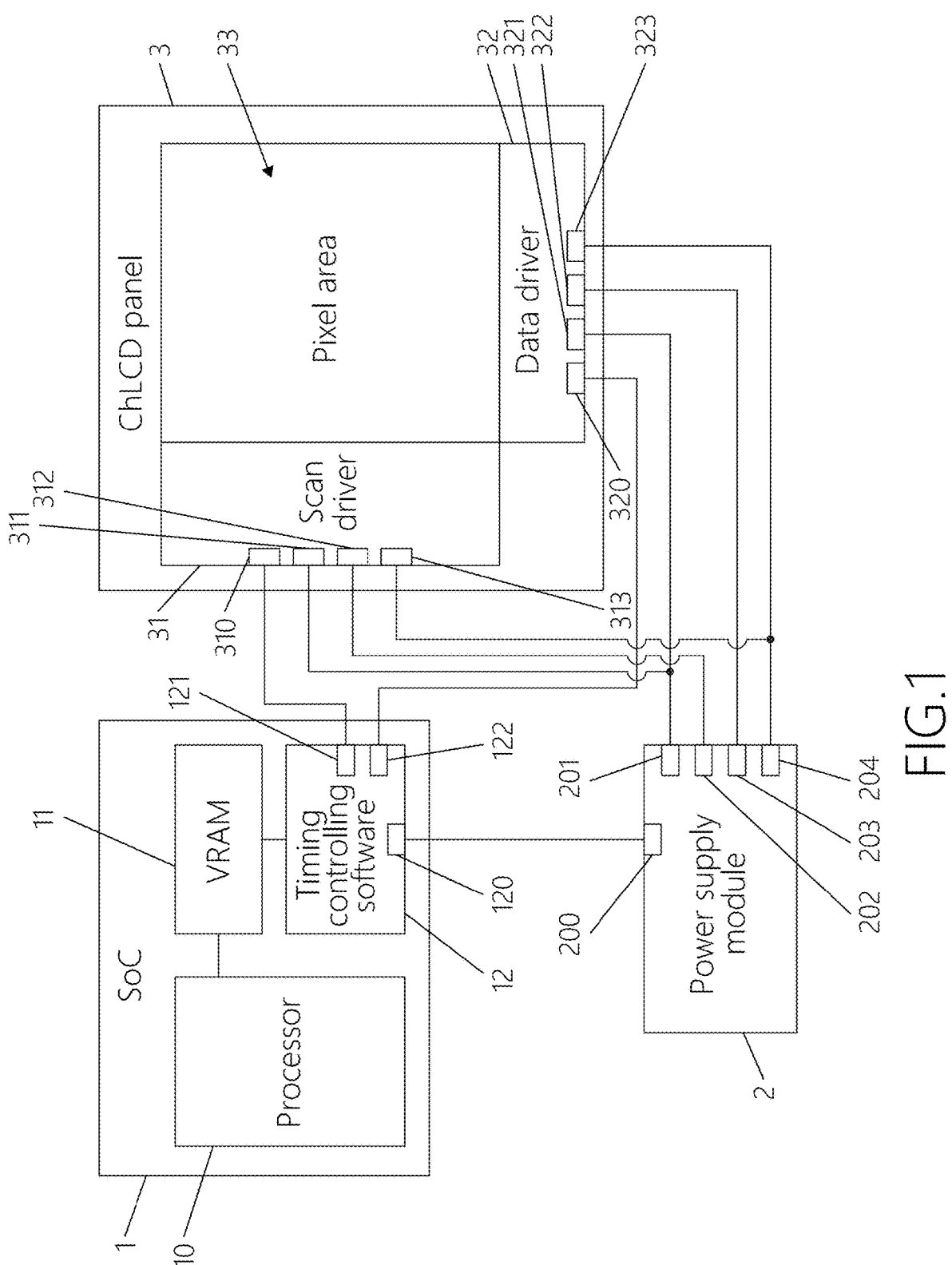
FIG. 1 is a perspective view of a cholesteric liquid crystal display device with timing controlling software of the present invention.

With reference to FIG. 1, the present invention provides a cholesteric liquid crystal display device with timing controlling software. The cholesteric liquid crystal display device of the present invention includes a system on a chip (SoC) 1, a power supply module 2, and a cholesteric liquid crystal display (ChLCD) panel 3.

The ChLCD panel 3 includes a scan driver 31, a data driver 32, and a pixel area 33. A plurality of pixels are included in the pixel area 33, and each of the pixels corresponds to a pair of pixel electrodes. Each pair of pixel electrodes are electrically connected between the scan driver 31 and the data driver 32. The ChLCD panel 3 of the present invention may be active matrix ChLCD or passive matrix ChLCD.

In an embodiment, the scan driver 31 includes a scan communication port 310 and a plurality of scan power ports 311, 312, and 313. The data driver 32 includes a data communication port 320 and a plurality of data power ports 321, 322, and 323.

The power supply module 2 includes a power communication port 200, a first power port 201, a second power port 202, a third power port 203, and a fourth power port 204. The first power port 201 is electrically connected to a first channel, the second power port 202 is electrically connected to a second channel, the third power port 203 is electrically connected to a third channel, and the fourth power port 204 is electrically connected to a fourth channel. The first channel, the second channel, and the fourth channel of the power supply module are electrically connected to the scan driver 31 of the ChLCD panel 3. The first channel, the third channel, and the fourth channel of the power supply module 2 are electrically connected to the data driver 32 of the ChLCD panel 3.

More particularly, the first power port 201, which is electrically connected to the first channel, is further electrically connected to the scan power port 311 and the data power port 321. The second power port 202, which is further electrically connected to the second channel, is further electrically connected to the scan power port 312. The third power port 203, which is electrically connected to the third channel, is further electrically connected to the data power port 322. The fourth power port 204, which is electrically connected to the fourth channel, is further electrically connected to the scan power port 313 and the data power port 323.

The SoC 1 includes a processor 10, a video random-access memory (VRAM) 11, and timing controlling software 12. The processor 10 is electrically connected to the VRAM 11, and the VRAM 11 is further electrically connected to the timing controlling software 12. The timing controlling software 12 includes a power control port 120, a scan control port 121, and a data control port 122. The power control port 120 is electrically connected to the power communication port 200 of the power supply module 2, the scan control port 121 is electrically connected to the scan communication port 310 of the ChLCD panel 3, and the data control port 122 is electrically connected to the data communication port 320 of the ChLCD panel 3.

Through the communications between the power control port 120 and the power communication port 200, the timing controlling software 12 of the SoC 1 configures and controls the power supply module 2 to output a first voltage amplitude from the first channel 201, to output a second voltage amplitude from the second channel 202, to output a third voltage amplitude from the third channel 203, and to output a fourth voltage amplitude from the fourth channel 204. The fourth voltage amplitude is greater than the third voltage amplitude, the third voltage amplitude is greater than the second voltage amplitude, and the second voltage amplitude is greater than the first voltage amplitude.

The timing controlling software 12 generates a voltage configuration command and a data format command according to a video signal. The timing controlling software 12 then outputs the data format command through the scan control port 121 and the data control port 122 respectively to the scan driver 31 and the data driver 32 of the ChLCD panel 3, allowing the ChLCD panel 3 to format a frame's data format according to the data format command. The timing controlling software 12 also outputs the voltage configuration command through the power control port 120 to the power communication port 200 of the power supply module 2, thus allowing the power supply module 2, according to the voltage configuration command and the first to the fourth voltage amplitudes, to first generate a reset voltage needed across the pixel electrodes for resetting the ChLCD panel 3, and then generate a display voltage needed across the pixel electrodes for displaying a frame. The reset voltage and the display voltage are respectively generated from a basis of mixing the first voltage amplitude to the fourth voltage amplitude to obtain an absolute value of a voltage. This mixed voltage is then chronologically supplied to the pixel electrodes of the ChLCD panel 3 for subsequently generating voltage potential differences, or just voltages, across each pair of the pixel electrodes, thus helping the ChLCD panel 3 to refresh the frame.

The timing controlling software 12 of the present invention is executed by the SoC 1, and therefore, a timing controller is completely replaced. More particularly, the SoC 1 normally possesses excess processing capabilities that are idling without use. The present invention utilizes the SoC 1, as an already existing piece of hardware possibly embedded within an already existing processing chip, and re-purposes a part of the processing capabilities of the SoC 1 for executing the timing controlling software 12. As a result, the present invention saves designing and manufacturing costs by avoiding adopting a timing controller, and the present invention also frees a physical space designated for the timing controller by not adopting the timing controller.

Moreover, since the timing controlling software 12 is programmed from the SoC 1, the timing controlling software 12 may be more freely and more efficiently programmed for use. As such, the present invention improves how the timing controlling software 12 and the power supply module 2 drive the ChLCD panel 3, allowing the ChLCD panel 3 to be driven more time efficiently to refresh different frames. As a result, the ChLCD panel 3 is able to display each of the frames more time efficiently.

Figures 2A, 2B:
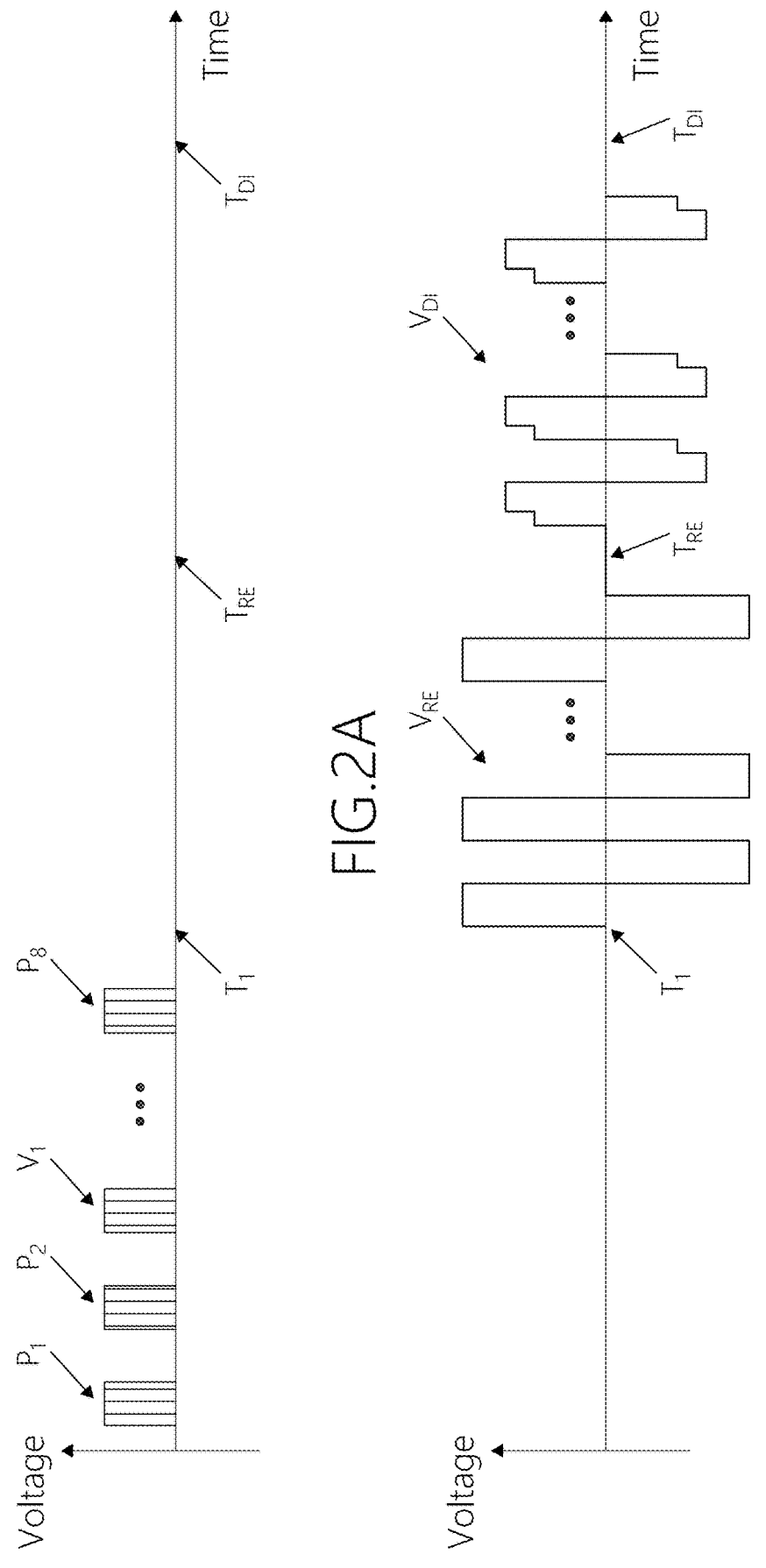
FIG. 2A is a signal perspective view of a voltage configuration command sent by the timing controlling software of the present invention.
FIG. 2B is a signal perspective view of a voltage across pixel electrodes of the cholesteric liquid crystal display device of the present invention.

With reference to FIG. 2A and FIG. 2B, vertical axes represent voltages in units of volts (V), and the horizontal axes represent time in units of milliseconds (ms). When the timing controlling software 12 is about to reset a frame currently displayed by the ChLCD panel 3 and to display a new frame on the ChLCD panel 3, the timing controlling software 12 generates a voltage configuration command $V_1$ as shown in FIG. 2A and sends the voltage configuration command $V_1$ to the power communication port 200 of the power supply module 2. This way, the timing controlling software 12 only once contacts the power supply module 2 for generating voltages. The voltage configuration command $V_1$ is a pulse train, and according to a chronological order of each of the pulses, voltages outputted from the first channel 201 to the fourth channel 204 are being generated. This action of configuring the power supply module 2 to generate voltages consumes a first configuration time $T_1$.

Subsequently, as the scan driver 31 and the data driver 32 of the ChLCD panel 3 receive the various voltages outputted from the power supply module 2, the scan driver 31 and the data driver 32 generate a reset voltage $V_{RE}$ and then a display voltage $V_{DI}$. The action of the ChLCD panel 3 receiving the various voltages from the power supply module 2 and generating the reset voltage $V_{RE}$ consumes a reset time $T_{RE}$. The action of the ChLCD panel 3 receiving the various voltages from the power supply module 2 and generating the display voltage $V_{DI}$ consumes a display frame time $T_{DI}$.

Figures 8A, 8B:
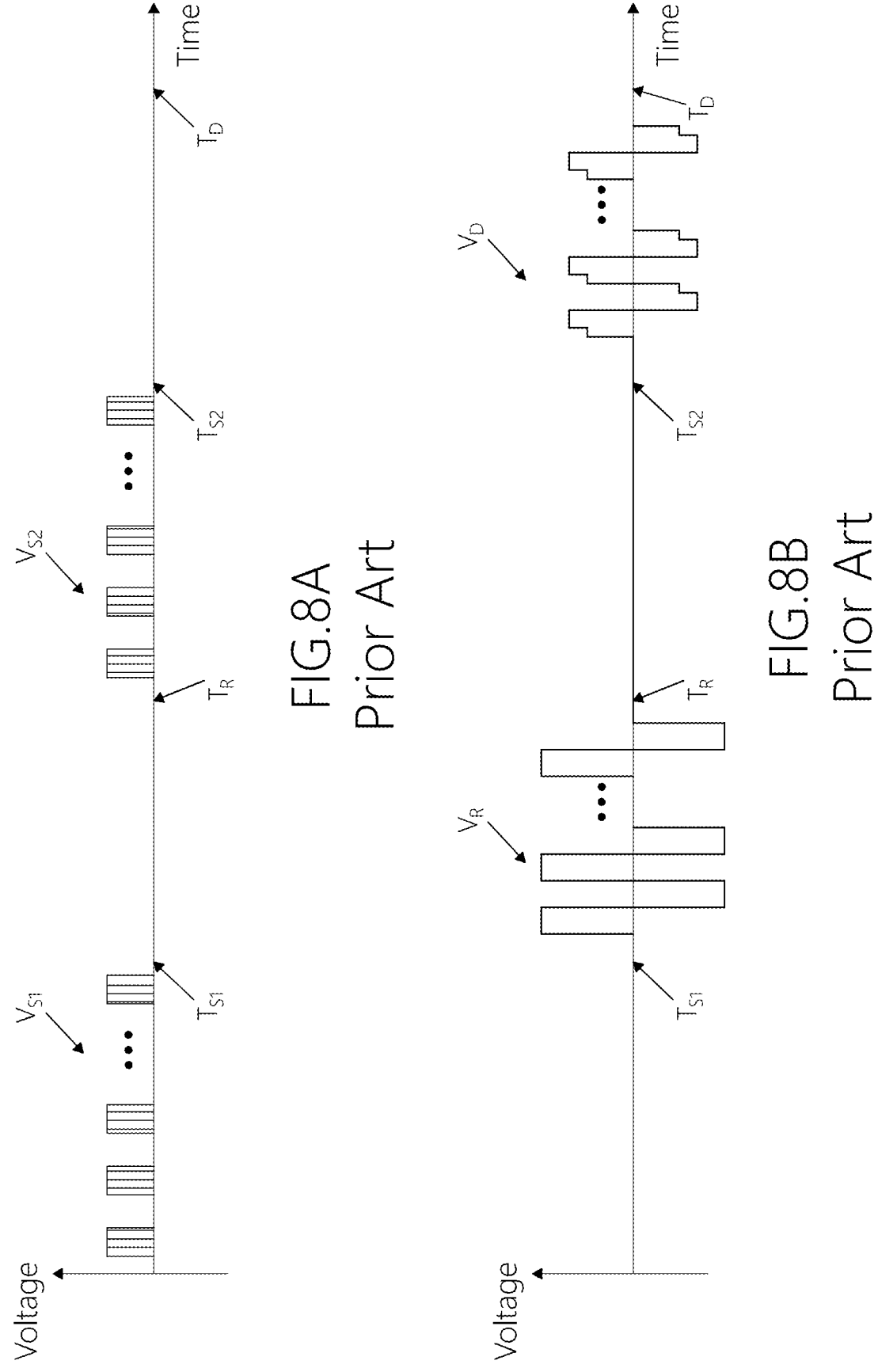
FIG. 8A is a signal perspective view of a timing controller of a conventional cholesteric liquid crystal display outputting a command to a power supply.
FIG. 8B is a signal perspective view of the conventional cholesteric liquid crystal display receiving voltage.

Whenever the ChLCD panel 3 wants to refresh a frame, or in other words, to reset a current frame and then to display a new frame, the cholesteric liquid crystal display device of the present invention only consumes a total time of the first configuration time $T_1$, the reset time $T_{RE}$, and display frame time $T_{DI}$. With reference to FIG. 8A and FIG. 8B, in comparison, the present invention consumes less time for refreshing a frame, or in other words, the present invention refreshes a frame faster. The power supply module 2 of the present invention only once needs to generate voltages according to a command from the timing controlling software 12. The timing controller, however, needs to command a power supply twice for generating appropriate voltages. Evidently, the present invention is able to control the power supply module 2 and the ChLCD panel 3 more time efficiently and more flexibly for refreshing a frame.

About the generation of the reset voltage $V_{RE}$ and the display voltage $V_{DI}$, the timing controlling software 12 only once needs to control the power supply module 2 to generate various voltages according to the following table 1:

TABLE 1

| Various voltages outputted by the power supply module according to the voltage configuration command: | | | |
|---|---|---|---|
| During positive period: | | During negative period: | |
| The first voltage amplitude outputting from the first channel is: | First high voltage | The first voltage amplitude outputting from the first channel is: | First low voltage |
| The second voltage amplitude outputting | Second high | The second voltage amplitude outputting | Second low |

TABLE 1-continued

| Various voltages outputted by the power supply module according to the voltage configuration command: | | | |
|---|---|---|---|
| During positive period: | | During negative period: | |
| from the second channel is: | voltage | from the second channel is: | voltage |
| The third voltage amplitude outputting from the third channel is: | Third high voltage | The third voltage amplitude outputting from the third channel is: | Third low voltage |
| The fourth voltage amplitude outputting from the fourth channel is: | Fourth high voltage | The fourth voltage amplitude outputting from the fourth channel is: | Fourth low voltage |

In an embodiment, the first channel 201 to the fourth channel 204 of the power supply module 2 each respectively may output a high voltage or a low voltage from two separate sub-channels. The first high voltage and the first low voltage have the same voltage amplitude, i.e., the first voltage amplitude. The second high voltage and the second low voltage also have the same voltage amplitude, i.e., the second voltage amplitude. The third high voltage and the third low voltage also have the same voltage amplitude, i.e., the third voltage amplitude. The fourth high voltage and the fourth low voltage also have the same voltage amplitude, i.e., the fourth voltage amplitude. In an embodiment, the high voltage is positive voltage, and the low voltage is negative voltage. For example, the first high voltage is a positive voltage, the first low voltage is a negative voltage, the second high voltage is a positive voltage, and the second low voltage is a negative voltage, etc.

For example, in an embodiment, each pair of the pixel electrodes in the ChLCD panel 3 are configured to display a single color pixel, and so the ChLCD panel 3 may only display a single color. In this embodiment, the first high voltage is +6 V, the first low voltage is −6 V, the second high voltage is +11 V, the second low voltage is −11 V, the third high voltage is +16 V, the third low voltage is −16 V, the fourth high voltage is +25 V, and the fourth low voltage is −25 V. Under this setting, please refer to the following table 2:

TABLE 2

| | Positive period: | | | Negative period: | | |
|---|---|---|---|---|---|---|
| Status: | Scan driver: | Data driver: | Voltage across liquid crystal: | Scan driver: | Data driver: | Voltage across liquid crystal: |
| Reset voltage: | +25 V | −25 V | 50 V | −25 V | +25 V | −50 V |
| Black scale voltage: | +6 V | −16 V | 22 V | −6 V | +16 V | −22 V |
| White scale voltage: | +6 V | −6 V | 12 V | −6 V | +6 V | −12 V |
| Black scale keeping voltage for displaying same color: | −11 V | −16 V | 5 V | +11 V | +16 V | −5 V |
| White scale keeping voltage for displaying same color: | −11 V | −6 V | −5 V | +11 V | +6 V | 5 V |

The voltage across liquid crystal denoted in Table 2 represents a voltage calculated from a voltage of the scan driver 31 minus a voltage from the data driver 32. The black scale voltage for displaying same color, means a voltage needed for displaying a same color that is black. The white scale voltage for displaying same color means a voltage needed for displaying a same color that is white.

When the power supply module 2 generates voltages according to the voltage configuration command in the positive period for resetting the pixel electrodes, the scan driver 31 adopts the fourth high voltage supplied by the power supply module 2, the data driver 32 adopts the fourth low voltage supplied by the power supply module 2, and thus allowing the pixel electrodes between the scan driver 31 and the data driver 32 to have a positive period reset voltage. According to Table 2, the positive period reset voltage is 25 V−(−25 V)=50 V.

When the power supply module 2 generates voltages according to the voltage configuration command in the negative period for resetting the pixel electrodes, the scan driver 31 adopts the fourth low voltage supplied by the power supply module 2, the data driver 32 adopts the fourth high voltage supplied by the power supply module 2, and thus allowing the pixel electrodes between the scan driver 31 and the data driver 32 to have a negative period reset voltage. According to Table 2, the negative period reset voltage is −25 V−(+25 V)=−50 V.

When the power supply module 2 generates voltages according to the voltage configuration command in the positive period for updating the pixel electrodes to display a black scale, the scan driver 31 adopts the first high voltage supplied by the power supply module 2, the data driver 32 adopts the third low voltage supplied by the power supply module 2, and thus allowing the pixel electrodes between the scan driver 31 and the data driver 32 to have a positive period black scale voltage. According to Table 2, the positive period black scale voltage is +6 V−(−16 V)=22 V.

When the power supply module 2 generates voltages according to the voltage configuration command in the negative period for updating the pixel electrodes to display the black scale, the scan driver 31 adopts the first low voltage supplied by the power supply module 2, the data driver 32 adopts the third high voltage supplied by the power supply module 2, and thus allowing the pixel electrodes between the scan driver 31 and the data driver 32 to have a negative period black scale voltage. According to Table 2, the negative period black scale voltage is −6 V−(+16 V)=−22 V.

When the power supply module 2 generates voltages according to the voltage configuration command in the positive period for updating the pixel electrodes to display a white scale, the scan driver 31 adopts the first high voltage supplied by the power supply module 2, the data driver 32 adopts the first low voltage supplied by the power supply module 2, and thus allowing the pixel electrodes between the scan driver 31 and the data driver 32 to have a positive period white scale voltage. According to Table 2, the positive period white scale voltage is +6 V−(−6 V)=12 V.

When the power supply module 2 generates voltages according to the voltage configuration command in the negative period for updating the pixel electrodes to display the white scale, the scan driver 31 adopts the first low voltage supplied by the power supply module 2, the data driver 32 adopts the first high voltage supplied by the power supply module 2, and thus allowing the pixel electrodes between the scan driver 31 and the data driver 32 to have a negative period white scale voltage. According to Table 2, the negative period white scale voltage is −6 V−(+6 V)=−12 V.

When the power supply module 2 generates voltages according to the voltage configuration command in the positive period for keeping the pixel electrodes displaying the black scale, the scan driver 31 adopts the second low voltage supplied by the power supply module 2, the data driver 32 adopts the third low voltage supplied by the power supply module 2, and thus allowing the pixel electrodes between the scan driver 31 and the data driver 32 to have a positive period black scale keeping voltage. According to Table 2, the positive period black scale keeping voltage is −11 V−(−16 V)=5 V.

When the power supply module 2 generates voltages according to the voltage configuration command in the negative period for keeping the pixel electrodes displaying the black scale, the scan driver 31 adopts the second high voltage supplied by the power supply module 2, the data driver 32 adopts the third high voltage supplied by the power supply module 2, and thus allowing the pixel electrodes between the scan driver 31 and the data driver 32 to have a negative period black scale keeping voltage. According to Table 2, the negative period black scale keeping voltage is +11 V−(+16 V)=−5 V.

When the power supply module 2 generates voltages according to the voltage configuration command in the positive period for keeping the pixel electrodes displaying the white scale, the scan driver 31 adopts the second low voltage supplied by the power supply module 2, the data driver 32 adopts the first low voltage supplied by the power supply module 2, and thus allowing the pixel electrodes between the scan driver 31 and the data driver 32 to have a positive period white scale keeping voltage. According to Table 2, the positive period white scale keeping voltage is −11 V−(−6 V)=−5 V.

When the power supply module 2 generates voltages according to the voltage configuration command in the negative period for keeping the pixel electrodes displaying the white scale, the scan driver 31 adopts the second high voltage supplied by the power supply module 2, the data driver 32 adopts the first high voltage supplied by the power supply module 2, and thus allowing the pixel electrodes between the scan driver 31 and the data driver 32 to have a negative period white scale keeping voltage. According to Table 2, the negative period white scale keeping voltage is +11 V−(+6 V)=5 V.

As previously mentioned, in the present invention, each of the power ports includes two sub-channels for outputting different voltages, and therefore, the first channel 201 to the fourth channel 204 of the power supply module 2 include a total of 8 sub-channels for outputting various voltages. In FIG. 2A, the voltage configuration command $V_1$ includes a total of 8 pulses, such as including a first pulse $P_1$ that is chronologically first, a second pulse $P_2$ that is chronologically second, and an eighth pulse $P_8$ that is chronologically as the last pulse. According to the chronological order of the voltage configuration command $V_1$, the voltage configuration command $V_1$ in FIG. 2A respectively uses each pulse to configure a voltage outputted from one of the sub-channels.

Figures 2C, 2D:
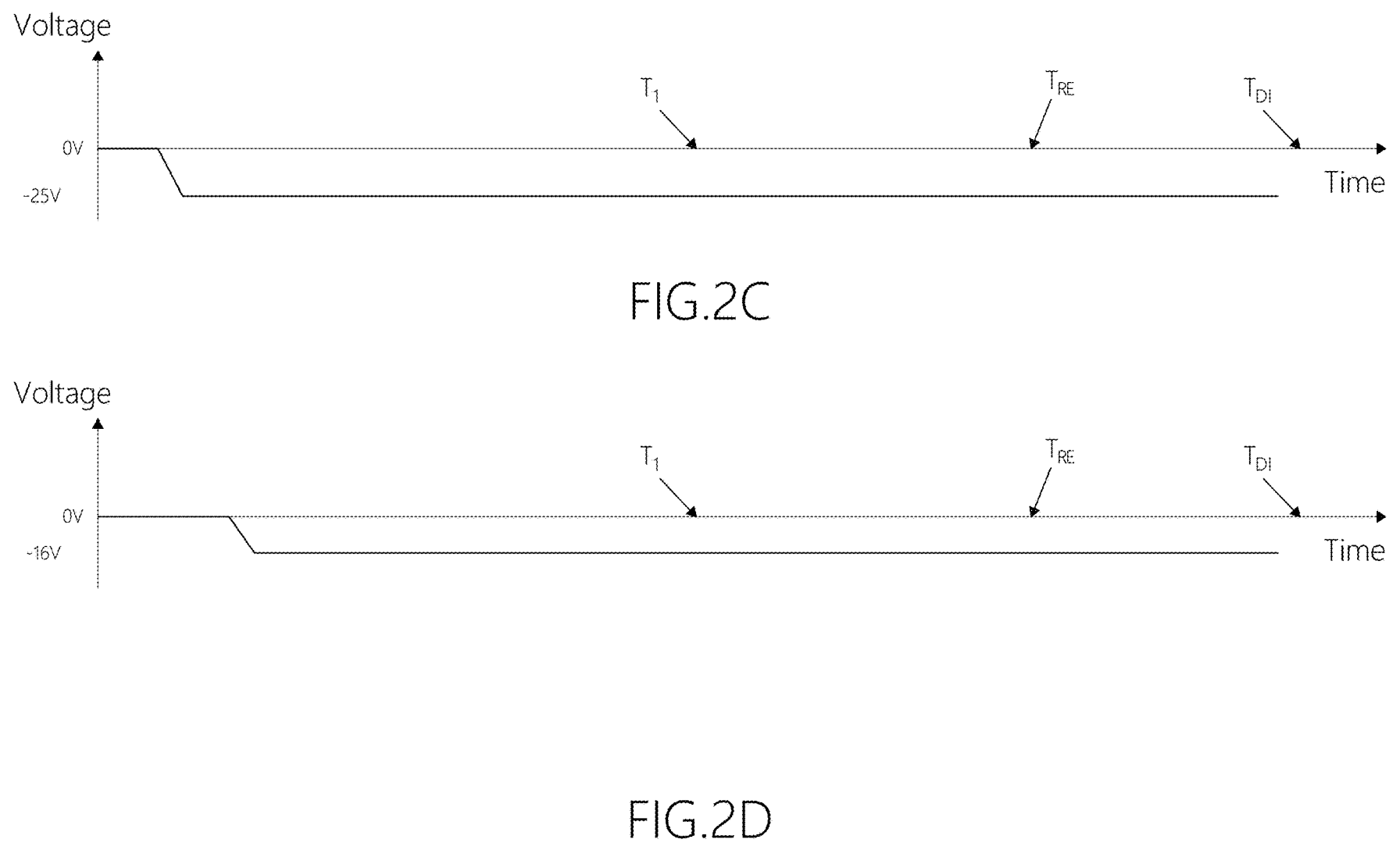

With references to FIGS. 2C to 2J:

FIG. 2C represents one of the sub-channels of the fourth channel 204 being programmed by the first pulse $P_1$ of the voltage configuration command $V_1$ to generate a voltage from zero volt to the fourth low voltage at −25 V.

FIG. 2D represents one of the sub-channels of the third channel 203 being programmed by the second pulse $P_2$ of the voltage configuration command $V_1$ to generate a voltage from zero volt to the third low voltage at −16 V.

Figures 2E, 2F:
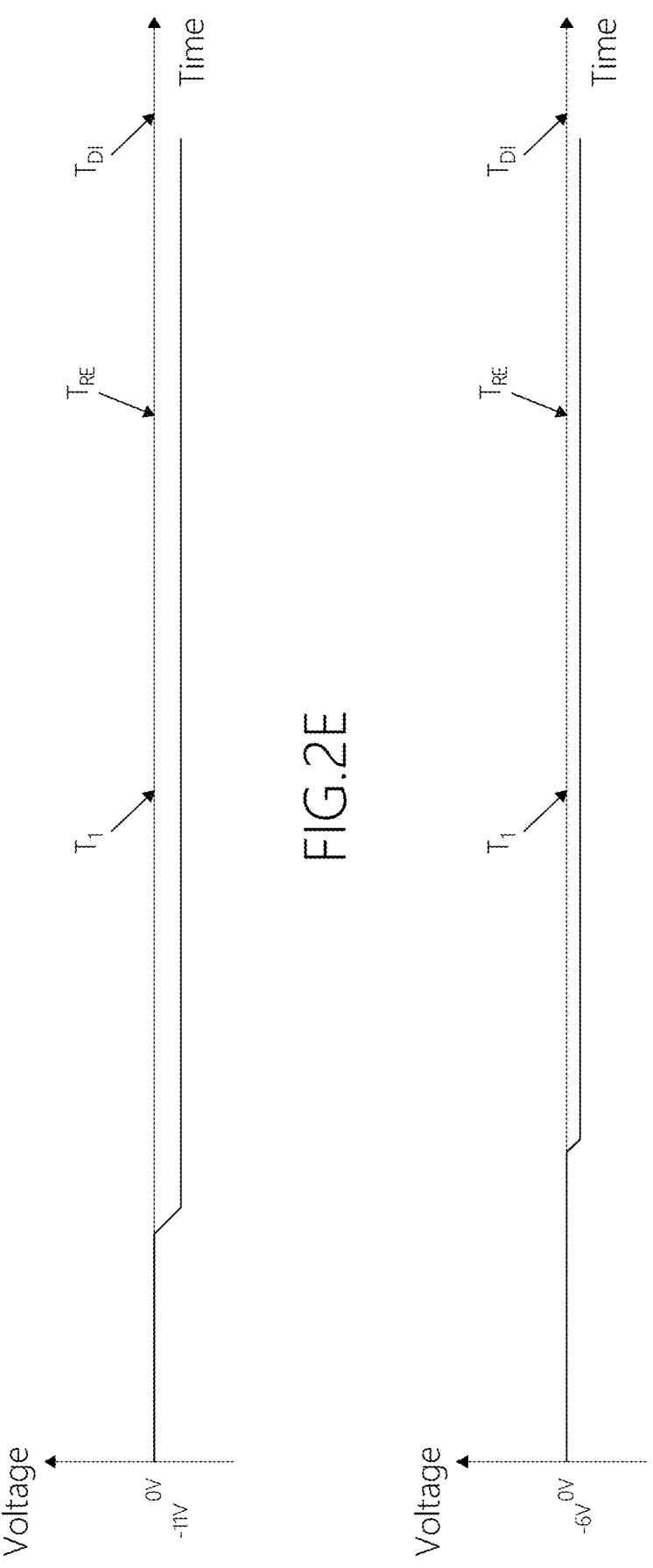
FIG. 2E is a signal perspective view of the power supply module of the cholesteric liquid crystal display device of the present invention, generating a second low voltage signal.
FIG. 2F is a signal perspective view of the power supply module of the cholesteric liquid crystal display device of the present invention, generating a first low voltage signal.

FIG. 2E represents one of the sub-channels of the second channel 202 being programmed by the third pulse of the voltage configuration command $V_1$ to generate a voltage from zero volt to the second low voltage at −11 V.

FIG. 2F represents one of the sub-channels of the first channel 201 being programmed by the fourth pulse of the voltage configuration command $V_1$ to generate a voltage from zero volt to the first low voltage at −6 V.

FIG. 2G represents another one of the sub-channels of the fourth channel 204 being programmed by the fifth pulse of the voltage configuration command $V_1$ to generate a voltage from zero volt to the fourth high voltage at +25 V.

FIG. 2H represents another one of the sub-channels of the third channel 203 being programmed by the sixth pulse of the voltage configuration command $V_1$ to generate a voltage from zero volt to the third high voltage at +16 V.

Figures 2I, 2J:
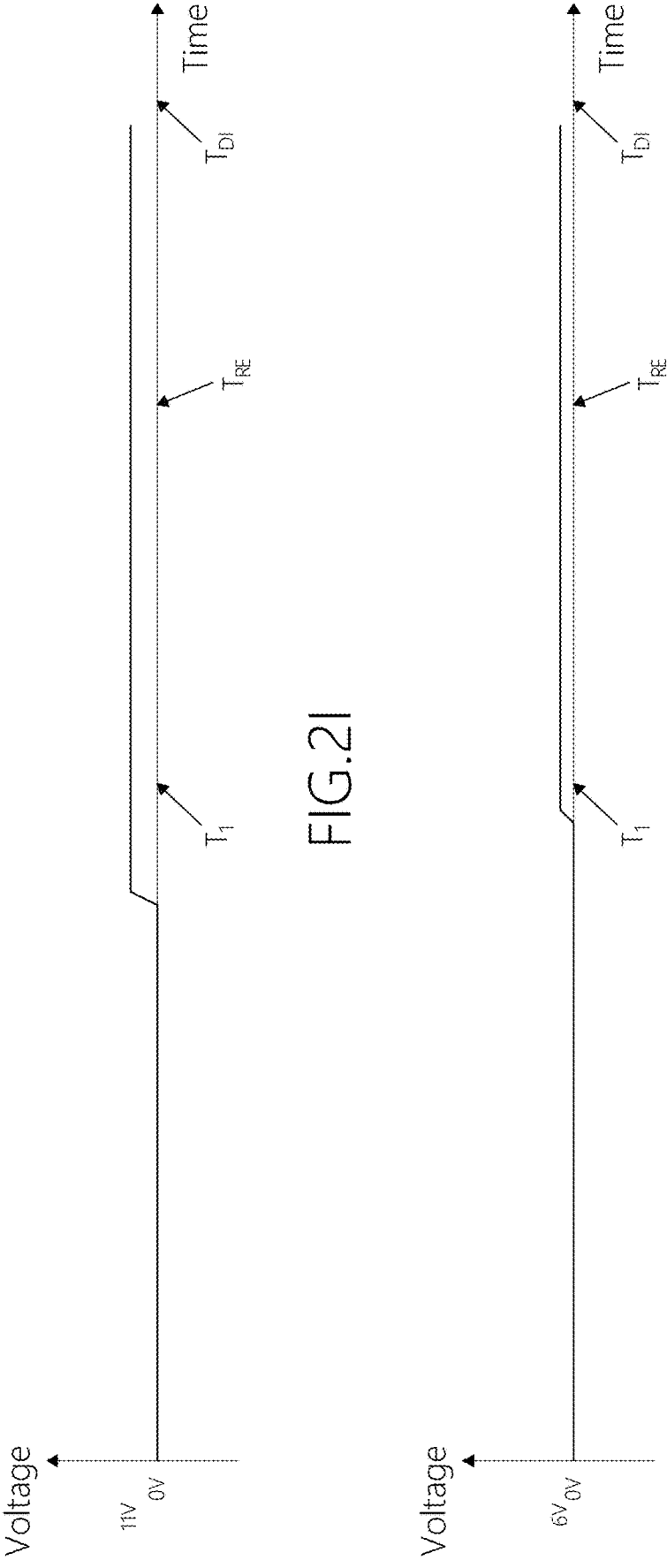
FIG. 2I is a signal perspective view of the power supply module of the cholesteric liquid crystal display device of the present invention, generating a second high voltage signal.
FIG. 2J is a signal perspective view of the power supply module of the cholesteric liquid crystal display device of the present invention, generating a first high voltage signal.

FIG. 2I represents another one of the sub-channels of the second channel 202 being programmed by the seventh pulse of the voltage configuration command $V_1$ to generate a voltage from zero volt to the second high voltage at +11 V.

FIG. 2J represents another one of the sub-channels of the first channel 201 being programmed by the eighth pulse $P_8$ of the voltage configuration command $V_1$ to generate a voltage from zero volt to the first high voltage at +6 V.

As shown in FIGS. 2C to 2J, the power supply module 2 consumes the first configuration time $T_1$ for programming the 8 sub-channels to output 8 different voltages.

Figure 2K:
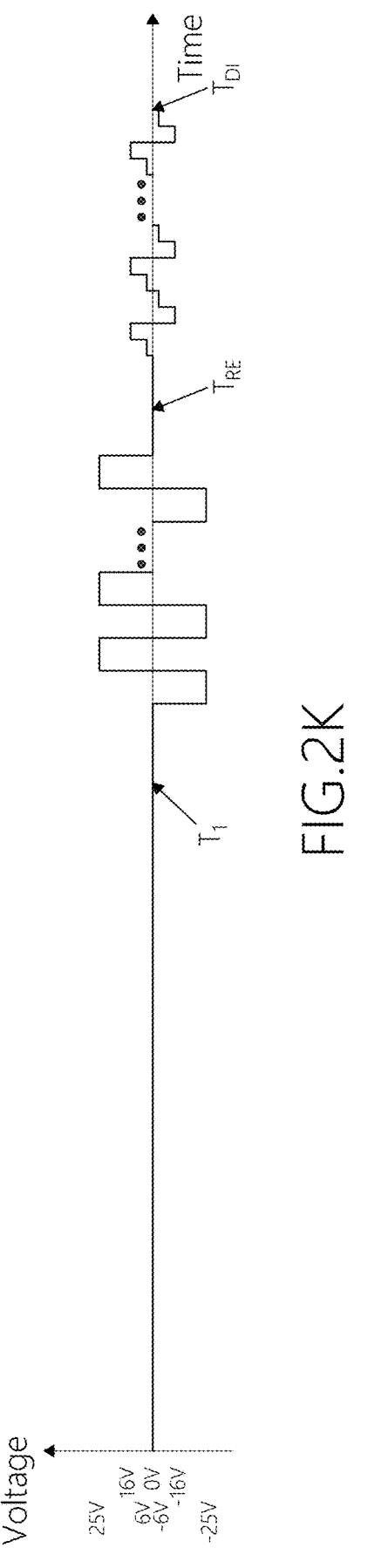
FIG. 2K is a signal perspective view of a data driver in a cholesteric liquid crystal display panel of the cholesteric liquid crystal display device of the present invention generating voltage.
Figure 2L:
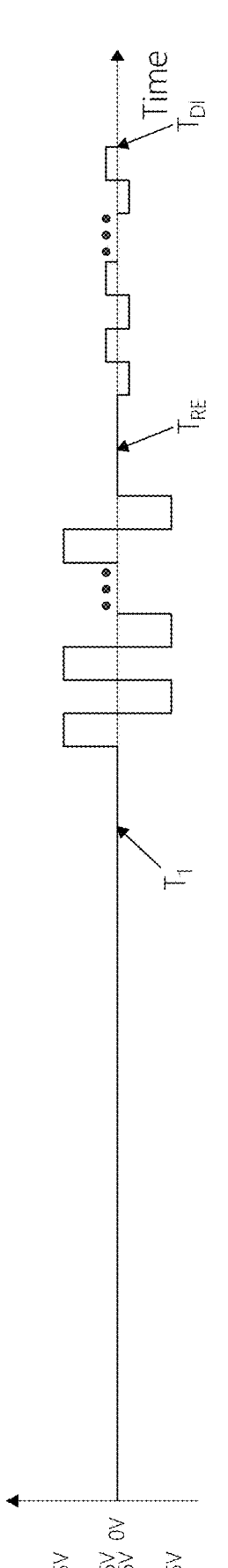
FIG. 2L is a signal perspective view of a scan driver in the cholesteric liquid crystal display panel of the cholesteric liquid crystal display device of the present invention generating voltage.

With references to FIGS. 2K, 2L, and 2B, in regards to the 8 different voltages outputted by the power supply module 2, FIG. 2K represents the voltage generated by the data driver 32, FIG. 2L represents the voltage generated by the scan driver 31, and the voltage in FIG. 2B represents the voltage of the scan driver 31 minus the voltage of the data driver 32. The voltage in FIG. 2B, or rather the potential difference between the scan driver 31 and the data driver 32, includes both the reset voltage $V_{RE}$ and the display voltage $V_{DI}$.

In another embodiment, the pixel electrodes of the ChLCD panel 3 are configured to light up a plurality of blue pixels and a plurality of red pixels. In other words, the ChLCD panel 3 is capable of blue-red dual-color displaying.

As such, the first voltage amplitude, as previously described to be programmed for the power supply module 2, includes a blue first high voltage and a blue first low voltage. Similarly, the second voltage amplitude includes a blue second high voltage and a blue second low voltage. The third voltage amplitude includes a blue third high voltage and a blue third low voltage. The fourth voltage amplitude includes a blue fourth high voltage and a blue fourth low voltage.

Apart from the four channels described for the power supply module 2, the power supply module 2 further includes a red first channel, a red second channel, a red third channel, and a red fourth channel. Each channel corresponds to a port for outputting voltages to the ChLCD panel 3. The red first channel, the red second channel, and the red fourth channel are electrically connected to the scan driver 31 of the ChLCD panel 3. The red first channel, the red third channel, and the red fourth channel are electrically connected to the data driver 32 of the ChLCD panel 3.

The timing controlling software 12 also configures and controls the power supply module 2 to output a red first high voltage and a red first low voltage at the red first channel, to output a red second high voltage and a red second low voltage at the red second channel, to output a red third high voltage and a red third low voltage at the red third channel, and to output a red fourth high voltage and a red fourth low voltage at the red fourth channel.

Furthermore, the timing controlling software 12 uses the voltage configuration command to control the power supply module 2 for generating voltages, for allowing the ChLCD panel 3 to reset the blue pixels according to the blue fourth high voltage and the blue fourth low voltage, and for allowing the ChLCD panel 3 to reset the red pixels according to the red fourth high voltage and the red fourth low voltage. In the technical field of ChLCD, the way the power supply module 2 generates voltages for the ChLCD panel 3 to reset a frame and to display a blue-red dual-color frame composed by the blue pixels and the red pixels, are analogous to the way the power supply module 2 generates voltages for the ChLCD panel 3 to reset a single-colored frame and to display a new single-colored frame. For this reason, further description of how a blue-red dual-color frame is refreshed is omitted.

In another embodiment, the pixel electrodes of the ChLCD panel 3 are configured to light up a plurality of blue pixels, a plurality of green pixels, and a plurality of red pixels. In other words, the ChLCD panel 3 is capable of full-color displaying.

As such, the power supply module 2 additionally includes a green first channel, a green second channel, a green third channel, and a green fourth channel. The green first channel, the green second channel, and the green fourth channel are electrically connected to the scan driver 31 of the ChLCD panel 3. The green first channel, the green third channel, and the green fourth channel are electrically connected to the data driver 32 of the ChLCD panel 3.

The timing controlling software 12 also configures and controls the power supply module 2 to output a green first high voltage and a green first low voltage at the green first channel, to output a green second high voltage and a green second low voltage at the green second channel, to output a green third high voltage and a green third low voltage at the green third channel, and to output a green fourth high voltage and a green fourth low voltage at the green fourth channel.

Furthermore, the timing controlling software 12 uses the voltage configuration command to control the power supply module 2 for generating voltages, for allowing the ChLCD panel 3 to reset the blue pixels according to the blue fourth high voltage and the blue fourth low voltage, for allowing the ChLCD panel 3 to reset the red pixels according to the red fourth high voltage and the red fourth low voltage, and for allowing the ChLCD panel 3 to reset the green pixels according to the green fourth high voltage and the green fourth low voltage. In the technical field of ChLCD, the way the power supply module 2 generates voltages for the ChLCD panel 3 to reset an RGB full-colored frame and to display an RGB full-colored frame composed by the red pixels, the green pixels, and the blue pixels, are analogous to the way the power supply module 2 generates voltages for the ChLCD panel 3 to reset a single-colored frame and to display a new single-colored frame. For this reason, further description of how an RGB full-colored frame is refreshed is omitted.

With reference to FIG. 1, in an embodiment, the scan control port 121 and the data control port 122 of the timing controlling software 12 are electrically connected to the scan communication port 310 of the scan driver 31 and the data communication port 320 of the data driver 32 through a low voltage transistor-transistor logic (LVTTL) interface, for sending the data format command from the timing controlling software 12 to the scan driver 31 and the data driver 32 of the ChLCD panel 3.

Furthermore, the timing controlling software 12 communicates with the power supply module 2 through an inter-integrated circuit ($I^2C$) for configuring and controlling the power supply module 2.

Figure 3:
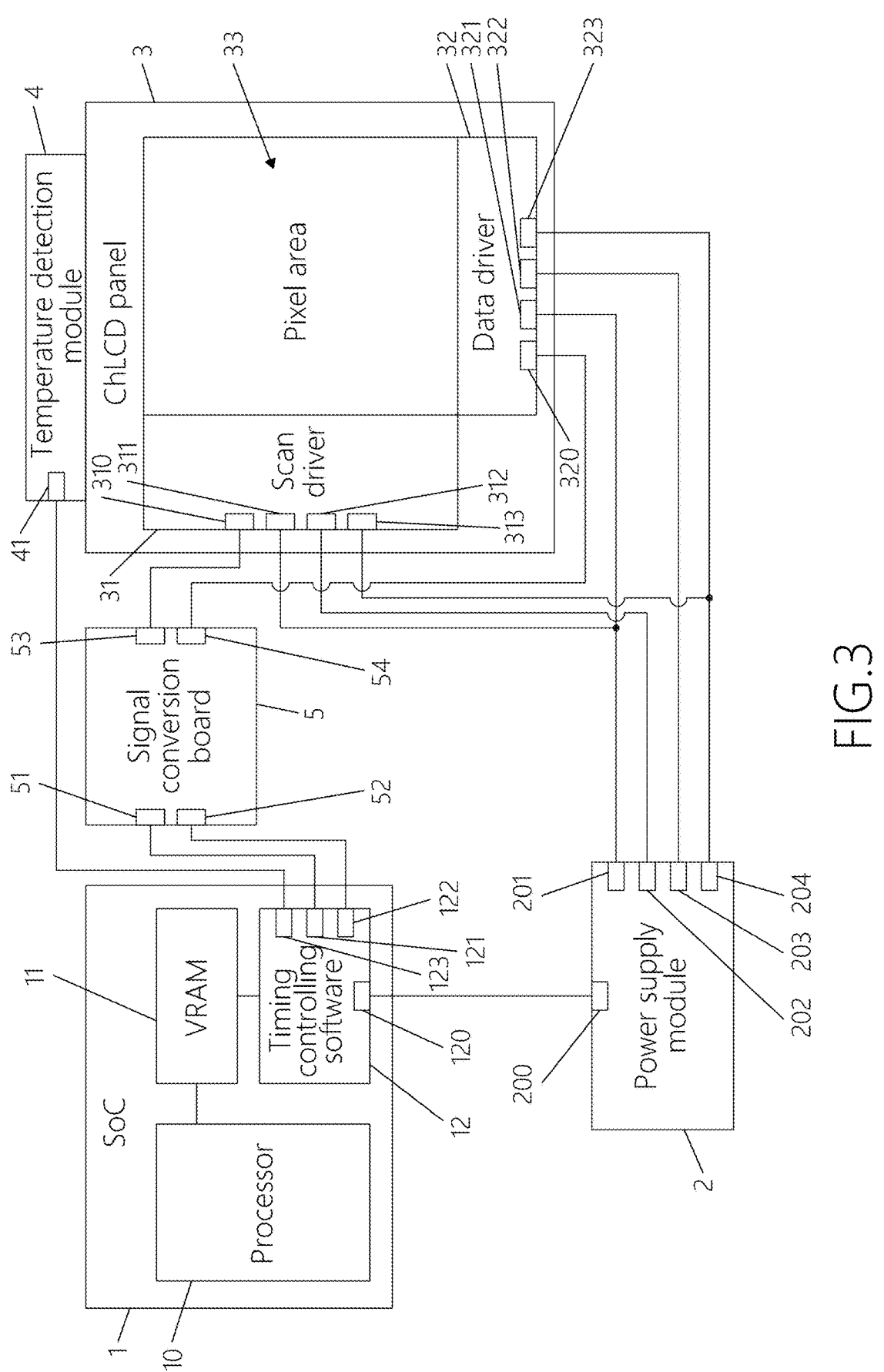
FIG. 3 is another perspective view of the cholesteric liquid crystal display device with the timing controlling software of the present invention.

With reference to FIG. 3, in an embodiment, the present invention further includes a temperature detection module 4 and a signal conversion board 5.

The timing controlling software 12 includes a temperature communication port 123. The temperature communication port 123 is electrically connected to a first temperature communication port 41 of the temperature detection module 4. Since the cholesteric liquid crystal inside of the ChLCD panel 3 is a temperature-sensitive material, the temperature detection module 4 is connected to the ChLCD panel 3. For example, the temperature detection module 4 is mounted on a circuit board inside of the ChLCD panel 3. The temperature detection module 4 detects a temperature of the ChLCD panel 3, accordingly generates a temperature detection signal, and outputs the temperature detection signal to the timing controlling software 12. The timing controlling software 12 adjusts the first voltage amplitude, the second voltage amplitude, the third voltage amplitude, and the fourth voltage amplitude, which are configured for the power supply module 2 to generate, according to the temperature detection signal. As a result, when the timing controlling software 12 controls the power supply module 2 to generate the various voltages for the ChLCD panel 3, the various voltages are adjusted corresponding to the temperature detection signal.

Furthermore, the signal conversion board 5 includes a first conversion port 51, a second conversion port 52, a third conversion port 53, and a fourth conversion port 54. The first conversion port 51 is electrically connected to the scan control port 121 of the timing controlling software 12, the second conversion port 52 is electrically connected to the data control port 122 of the timing controlling software 12, the third conversion port 53 is electrically connected to the scan communication port 310 of the scan driver 31, and the fourth conversion port 54 is electrically connected to the data communication port 320 of the data driver 32.

The timing controlling software 12 first outputs LVTTL signals from the scan control port 121 and the data control port 122 respectively to the first conversion port 51 and the second conversion port 52 of the signal conversion board 5. Then the signal conversion board 5 converts the LVTTL signals into mini low-voltage differential signaling (Mini-LVDS) signals, and subsequently, the signal conversion board 5 outputs the Mini-LVDS signals through the third conversion port 53 and the fourth conversion port 54 respectively to the scan communication port 310 and the data communication port 320 of the ChLCD panel 3. In other words, the scan control port 121 of the timing controlling software 12 is electrically connected to the scan communication port 310 of the ChLCD panel 3 through the signal conversion board 5, and the data control port 122 of the timing controlling software 12 is electrically connected to the data communication port 320 of the data driver 32 also through the signal conversion board 5.

In an embodiment, the signal conversion board 5 is a field programmable gate array (FPGA), wherein the signal conversion board 5 converts LVTTL signals to Mini-LVDS signals through the FPGA, and outputs the Mini-LVDS signals to the ChLCD panel 3.

In another embodiment, the signal conversion board 5 is a complex programmable logic device (CPLD), wherein the signal conversion board 5 converts LVTTL signals to Mini-LVDS signals through the CPLD, and outputs the Mini-LVDS signals to the ChLCD panel 3.

Figure 4:
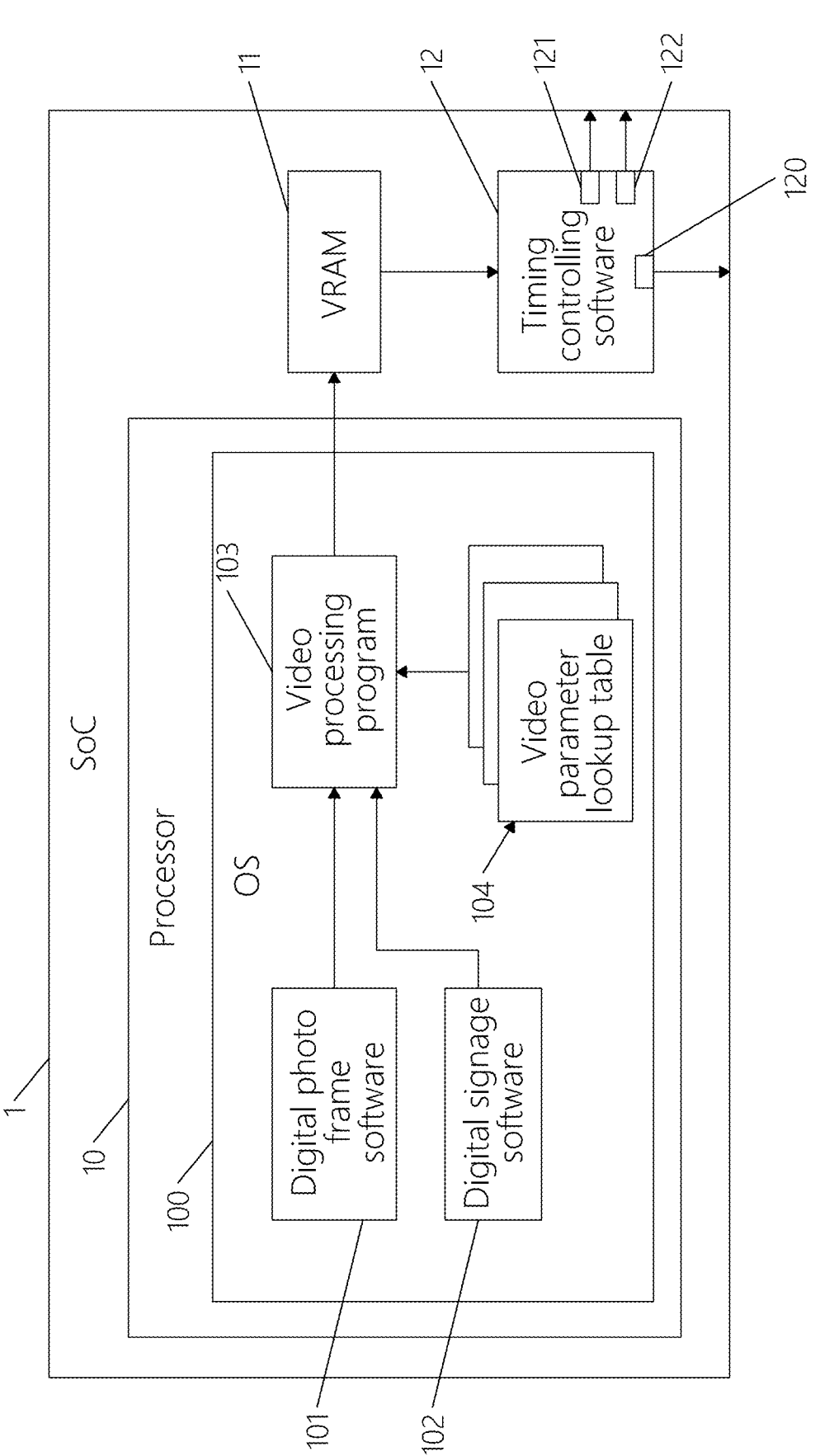
FIG. 4 is a perspective view of a system on a chip (SoC) of the cholesteric liquid crystal display device generating signal in an embodiment of the present invention.

With reference to FIG. 4, in an embodiment, the processor 10 in the SoC 1 is executing an operating system (OS) 100, and the OS 100 stores a plurality of video software, a video processing program 103, and a plurality of video parameter lookup tables 104. The plurality of video software includes, for example, a digital photo frame software 101 and a digital signage software 102. The OS 100, for example, is a Linux/Android operating system.

The video processing program 103 in the OS 100 may receive a video from one of the video software, such as receiving a digital photo frame footage from the digital photo frame software 101 or receiving a digital signage footage from the digital signage software 102. The digital photo frame footage and the digital signage footage may be in different video formats, yet both formats of the digital photo frame footage and the digital signage footage would respectively correspond to one of the video parameter lookup tables 104 stored in the OS 100.

As a result, the video processing program 103 may use one of the video parameter lookup tables 104 to help acquire a video data. The video processing program 103 then stores the video data in the VRAM 11, and outputs the video signal corresponding to the video data from the VRAM 11 to the timing controlling software 12. Upon receiving the video signal, the timing controlling software 12 then configures to output the voltage configuration command to the power supply module 2 and to output the data format command to the ChLCD panel 3 according to the video signal.

Figure 5:
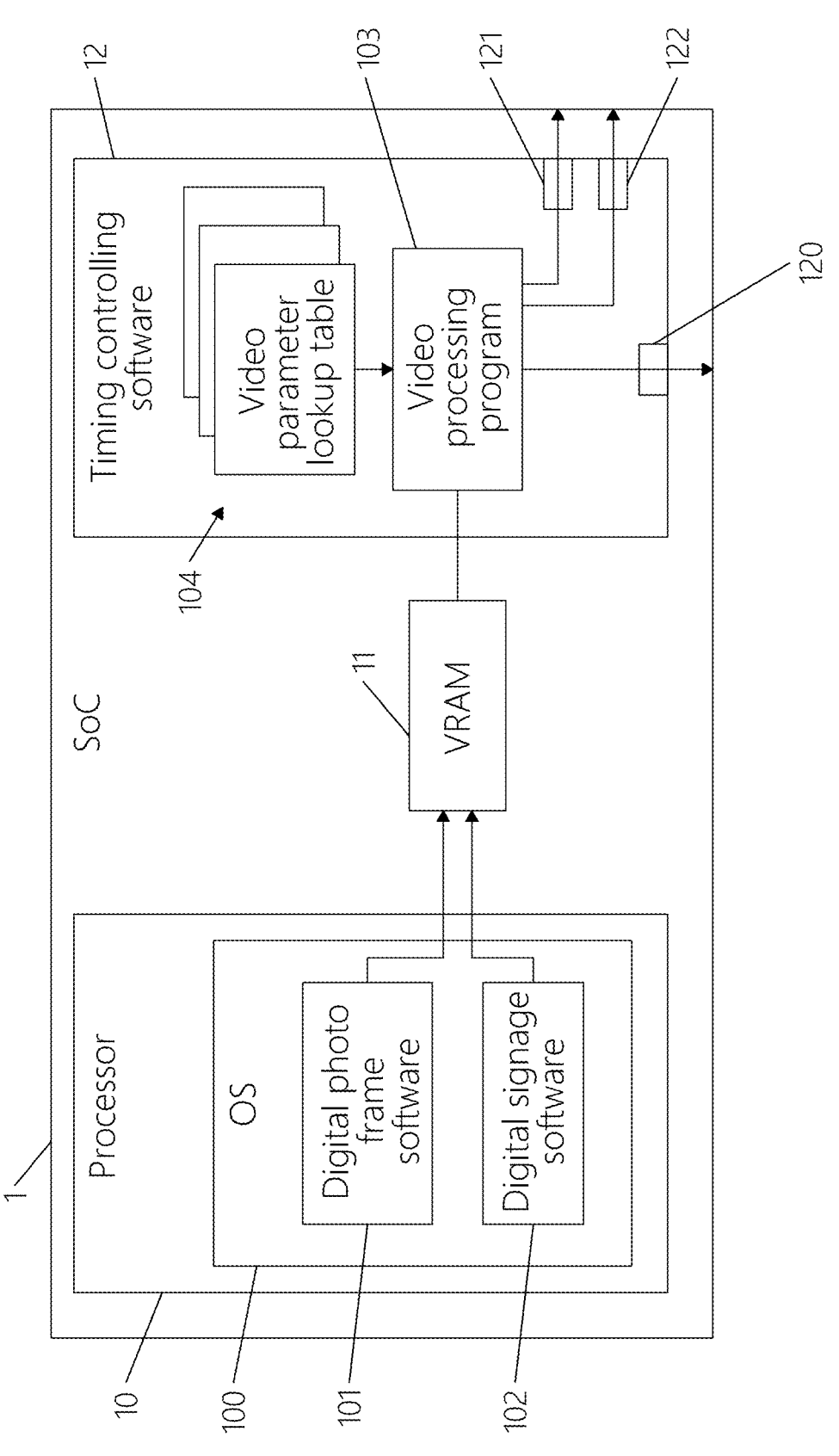
FIG. 5 is a perspective view of the SoC of the cholesteric liquid crystal display device generating signal in another embodiment of the present invention.

With reference to FIG. 5, in another embodiment, the OS 100 only stores the plurality of video software, such as storing a digital photo frame software 101 and a digital signage software 102. The video processing program 103 and the plurality of video parameter lookup tables 104 are stored in the timing controlling software 12. As a result, the VRAM 11 receives the video from one of the video software, and the VRAM 11 outputs the video signal corresponding to the video to the video processing program 103 stored in the timing controlling software 12. The video signal originated from the digital photo frame software 101 and the video signal originated from the digital signage software 102 may have different video formats; however, in any case, the plurality of video parameter lookup tables 104 stored in the timing controlling software 12 would have corresponding formats to the video signals.

The video processing program 103 in the timing controlling software 12 configures the voltage configuration command and the data format command according to the video data format of the video signal and one of the video parameter lookup tables 104 that corresponds to the video data format of the video signal.

With references to FIG. 6 and FIG. 7, in an embodiment, in order to refresh each of the frames displayed by the ChLCD panel 3 with great quality, the present invention executes the following steps:

step S1: outputting a frame refresh command from a video software, such as from the aforementioned digital photo frame software 101 or the digital signage software 102, in the OS 100 that is executed by the processor 10 in the SoC 1; wherein the frame refresh command allows the video software to define a displaying direction and a displaying mode of a new frame;

step S2: pausing all processes executed by the video software by the OS 100, and transferring an authority of updating the frame to the timing controlling software 12 in the SoC 1 by the OS 100;

step S3: once the timing controlling software 12 receives the authority of updating the frame, obtaining a temperature data of the ChLCD panel 3 from the temperature detection module 4 through the I²C by the timing controlling software 12, i.e., obtaining a panel temperature according to the temperature detection signal obtained from the temperature detection module 4 by the timing controlling software 12;

step S4: according to the panel temperature, configuring voltages needed by the power supply module 2 by looking up a voltage to temperature configuration table, configuring a chronological order of updating the frame by looking up a display order to temperature configuration table, and configuring a driver waveform suitable for updating the frame by looking up a driver waveform to temperature configuration table by the timing controlling software 12;

step S5: sending the voltage configuration command to the power supply module 2 through I²C by the timing controlling software 12;

step S6: sending display data to the scan driver 31 and the data driver 32 of the ChLCD panel 3, for resetting the frame and displaying a new frame, through the LVTTL interface by the timing controlling software 12; wherein this particular step corresponds to the aforementioned detailed description of how the timing controlling software 12 sends the data format command to the scan driver 31 and the data driver 32 of the ChLCD panel 3, thus allowing the ChLCD panel 3 to configure corresponding displaying formats for displaying the frame, and allowing the ChLCD panel 3 to further reset the frame and display a new frame;

step S7: once finishing displaying the frame, returning the authority from the timing controlling software 12 back to the OS 100 by the timing controlling software 12, and reporting a display successful status back to the video software in the OS 100 by the timing controlling software 12. As a result, upon receiving the display successful status from the timing controlling software 12, the video software in the OS 100 may start to configure a chronological order of displaying a next new frame.

What is claimed is:

1. A cholesteric liquid crystal display device with timing controlling software, comprising:

a cholesteric liquid crystal display (ChLCD) panel, comprising a scan driver, a data driver, and a plurality of pixel electrodes electrically connecting between the scan driver and the data driver;

a power supply module, comprising a first channel, a second channel, a third channel, and a fourth channel; wherein the first channel, the second channel, and the fourth channel are electrically connected to the scan driver of the ChLCD panel; and the first channel, the third channel, and the fourth channel are electrically connected to the data driver of the ChLCD panel; and a system on a chip (SoC), comprising the timing controlling software, and electrically connected to the power supply module, the scan driver of the ChLCD panel, and the data driver of the ChLCD panel;

wherein the timing controlling software configures and controls the power supply module to output a first voltage amplitude from the first channel, to output a second voltage amplitude from the second channel, to output a third voltage amplitude from the third channel, and to output a fourth voltage amplitude from the fourth channel; wherein the fourth voltage amplitude is greater than the third voltage amplitude, the third voltage amplitude is greater than the second voltage amplitude, and the second voltage amplitude is greater than the first voltage amplitude;

wherein the timing controlling software generates a voltage configuration command according to a video signal and outputs the voltage configuration command to the power supply module; wherein according to the voltage configuration command, the first voltage amplitude, the second voltage amplitude, the third voltage amplitude, and the fourth voltage amplitude, the power supply module generates a reset voltage needed across the pixel electrodes for resetting the ChLCD panel and generates a display voltage needed across the pixel electrodes for displaying a frame.

2. The cholesteric liquid crystal display device as claimed in claim 1, wherein the fourth voltage amplitude outputted from the fourth channel comprises a fourth high voltage and a fourth low voltage;

wherein when the power supply module generates voltages according to the voltage configuration command in a positive period for resetting the pixel electrodes, the power supply module supplies the fourth high voltage to the scan driver and supplies the fourth low voltage to the data driver, thus creating a positive period reset voltage between the data driver and the scan driver;

wherein when the power supply module generates voltages according to the voltage configuration command in a negative period for resetting the pixel electrodes, the power supply module supplies the fourth low voltage to the scan driver and supplies the fourth high voltage to the data driver, thus creating a negative period reset voltage between the data driver and the scan driver.

3. The cholesteric liquid crystal display device as claimed in claim 1, wherein the pixel electrodes in the ChLCD panel are configured for displaying a plurality of single-color pixels;

wherein the first voltage amplitude outputted from the first channel comprises a first high voltage and a first low voltage, and the third voltage amplitude outputted from the third channel comprises a third high voltage and a third low voltage;

wherein when the power supply module generates voltages according to the voltage configuration command in a positive period for updating the pixel electrodes to display a black scale, the power supply module supplies the first high voltage to the scan driver and supplies the third low voltage to the data driver, thus creating a positive period black scale voltage between the data driver and the scan driver;

wherein when the power supply module generates voltages according to the voltage configuration command in the positive period for updating the pixel electrodes to display a white scale, the power supply module supplies the first high voltage to the scan driver and supplies the first low voltage to the data driver, thus creating a positive period white scale voltage between the data driver and the scan driver;

wherein when the power supply module generates voltages according to the voltage configuration command in a negative period for updating the pixel electrodes to display the black scale, the power supply module supplies the first low voltage to the scan driver and supplies the third high voltage to the data driver, thus creating a negative period black scale voltage between the data driver and the scan driver; and wherein when the power supply module generates voltages according to the voltage configuration command in the negative period for updating the pixel electrodes to display the white scale, the power supply module supplies the first low voltage to the scan driver and supplies the first high voltage to the data driver, thus creating a negative period white scale voltage between the data driver and the scan driver.

4. The cholesteric liquid crystal display device as claimed in claim 3, wherein the second voltage amplitude outputted from the second channel comprises a second high voltage and a second low voltage;

wherein when the power supply module generates voltages according to the voltage configuration command in the positive period for keeping the pixel electrodes displaying the black scale, the power supply module supplies the second low voltage to the scan driver and supplies the third low voltage to the data driver, thus creating a positive period black scale keeping voltage between the data driver and the scan driver;

wherein when the power supply module generates voltages according to the voltage configuration command in the positive period for keeping the pixel electrodes displaying the white scale, the power supply module supplies the second low voltage to the scan driver and supplies the first low voltage to the data driver, thus creating a positive period white scale keeping voltage between the data driver and the scan driver;

wherein when the power supply module generates voltages according to the voltage configuration command in the negative period for keeping the pixel electrodes displaying the black scale, the power supply module supplies the second high voltage to the scan driver and supplies the third high voltage to the data driver, thus creating a negative period black scale keeping voltage between the data driver and the scan driver; and wherein when the power supply module generates voltages according to the voltage configuration command in the negative period for keeping the pixel electrodes displaying the white scale, the power supply module supplies the second high voltage to the scan driver and supplies the first high voltage to the data driver, thus creating a negative period white scale keeping voltage between the data driver and the scan driver.

5. The cholesteric liquid crystal display device as claimed in claim 1, wherein the pixel electrodes in the ChLCD panel are configured for displaying a plurality of blue pixels and a plurality of red pixels;

wherein the first voltage amplitude comprises a blue first high voltage and a blue first low voltage, the second voltage amplitude comprises a blue second high voltage and a blue second low voltage, the third voltage amplitude comprises a blue third high voltage and a blue third low voltage, and the fourth voltage amplitude comprises a blue fourth high voltage and a blue fourth low voltage;

wherein the power supply module further comprises a red first channel, a red second channel, a red third channel, and a red fourth channel; wherein the red first channel, the red second channel, and the red fourth channel are electrically connected to the scan driver of the ChLCD panel; and the red first channel, the red third channel, and the red fourth channel are electrically connected to the data driver of the ChLCD panel;

wherein the timing controlling software also configures and controls the power supply module to output a red first high voltage and a red first low voltage at the red first channel, to output a red second high voltage and a red second low voltage at the red second channel, to output a red third high voltage and a red third low voltage at the red third channel, and to output a red fourth high voltage and a red fourth low voltage at the red fourth channel;

wherein the timing controlling software controls the power supply module to generate the blue fourth high voltage and the blue fourth low voltage for the ChLCD panel to reset the blue pixels with the voltage configuration command, and the timing controlling software also controls the power supply module to generate the red fourth high voltage and the red fourth low voltage for the ChLCD panel to reset the red pixels with the voltage configuration command.

6. The cholesteric liquid crystal display device as claimed in claim 1, wherein the pixel electrodes in the ChLCD panel are configured for displaying a plurality of blue pixels, a plurality of green pixels, and a plurality of red pixels;

wherein the first voltage amplitude comprises a blue first high voltage and a blue first low voltage, the second voltage amplitude comprises a blue second high voltage and a blue second low voltage, the third voltage amplitude comprises a blue third high voltage and a blue third low voltage, and the fourth voltage amplitude comprises a blue fourth high voltage and a blue fourth low voltage;

wherein the power supply module further comprises a red first channel, a red second channel, a red third channel, a red fourth channel, a green first channel, a green second channel, a green third channel, and a green fourth channel; wherein the red first channel, the red second channel, the red fourth channel, the green first channel, the green second channel, and the green fourth channel are electrically connected to the scan driver of the ChLCD panel; and the red first channel, the red third channel, the red fourth channel, the green first channel, the green third channel, and the green fourth channel are electrically connected to the data driver of the ChLCD panel;

wherein the timing controlling software also configures and controls the power supply module to output a red first high voltage and a red first low voltage at the red first channel, to output a red second high voltage and a red second low voltage at the red second channel, to output a red third high voltage and a red third low voltage at the red third channel, to output a red fourth high voltage and a red fourth low voltage at the red fourth channel, to output a green first high voltage and a green first low voltage at the green first channel, to output a green second high voltage and a green second low voltage at the green second channel, to output a green third high voltage and a green third low voltage at the green third channel, and to output a green fourth high voltage and a green fourth low voltage at the green fourth channel;

wherein the timing controlling software controls the power supply module to generate the blue fourth high voltage and the blue fourth low voltage for the ChLCD panel to reset the blue pixels with the voltage configuration command, the timing controlling software also controls the power supply module to generate the red fourth high voltage and the red fourth low voltage for the ChLCD panel to reset the red pixels with the voltage configuration command, and the timing controlling software also controls the power supply module to generate the green fourth high voltage and the green fourth low voltage for the ChLCD panel to reset the green pixels with the voltage configuration command.

7. The cholesteric liquid crystal display device as claimed in claim 1, further comprising:

a temperature detection module, connected to the ChLCD panel, and electrically connected to the timing controlling software;

wherein the temperature detection module detects a temperature of the ChLCD panel, accordingly generates a temperature detection signal, and outputs the temperature detection signal to the timing controlling software;

wherein the timing controlling software adjusts the first voltage amplitude, the second voltage amplitude, the third voltage amplitude, and the fourth voltage amplitude, which are configured for the power supply module to generate, according to the temperature detection signal.

8. The cholesteric liquid crystal display device as claimed in claim 1, wherein the SoC comprises an operating system (OS) and a video random-access memory (VRAM), and the OS comprises a video software, a video processing program, and a plurality of video parameter lookup tables;

wherein the video processing program receives a video from the video software, generates a video data according to one of the video parameter lookup tables corresponding to a format of the video, and sends the video data to the VRAM;

wherein the VRAM outputs the video signal corresponding to the video data to the timing controlling software.

9. The cholesteric liquid crystal display device as claimed in claim 8, wherein the OS is a Linux/Android operating system, and the video software is a digital photo frame software or a digital signage software.

10. The cholesteric liquid crystal display device as claimed in claim 1, wherein the SoC comprises an operating system (OS) and a video random-access memory (VRAM), and the OS comprises a video software;

wherein the timing controlling software comprises a video processing program and a plurality of video parameter lookup tables;

wherein the VRAM receives a video from the video software, and the VRAM outputs the video signal corresponding to the video to the video processing program of the timing controlling software;

wherein the video processing program of the timing controlling software generates the voltage configuration command according to a video data format of the video signal and one of the video parameter lookup tables that corresponds to the video data format of the video signal.

11. The cholesteric liquid crystal display device as claimed in claim 10, wherein the OS is a Linux/Android operating system, and the video software is a digital photo frame software or a digital signage software.

12. The cholesteric liquid crystal display device as claimed in claim 1, wherein the timing controlling software communicates with the power supply module through an inter-integrated circuit ($I^2C$) for configuring and controlling the power supply module.

13. The cholesteric liquid crystal display device as claimed in claim 1, wherein the timing controlling software electrically connects to the scan driver and the data driver of the ChLCD panel through a low voltage transistor-transistor logic (LVTTL) interface.

14. The cholesteric liquid crystal display device as claimed in claim 1, wherein the timing controlling software first electrically connects to a signal conversion board through a low voltage transistor-transistor logic (LVTTL) interface, then through the signal conversion board, the timing controlling software further electrically connects to the scan driver and the data driver of the ChLCD panel;

wherein the signal conversion board outputs a low-voltage differential signaling (Mini-LVDS) signal to the scan driver and the data driver of the ChLCD panel.

15. The cholesteric liquid crystal display device as claimed in claim 1, further comprising:

a temperature detection module, connected to the ChLCD panel, and electrically connected to the timing controlling software; wherein the temperature detection module detects a temperature from the ChLCD panel, accordingly generates a temperature detection signal, and outputs the temperature detection signal to the timing controlling software.

16. The cholesteric liquid crystal display device as claimed in claim 15, wherein the SoC comprises an operating system (OS), and the OS stores a video software;

wherein the cholesteric liquid crystal display device with the timing controlling software executes the following steps for updating the frame:

outputting a frame refresh command from the video software in the OS that is executed by a processor in the SoC; wherein the frame refresh command allows the video software to define a displaying direction and a displaying mode of a new frame;

pausing all processes executed by the video software by the OS, and transferring an authority of updating the frame to the timing controlling software in the SoC by the OS;

once the timing controlling software received the authority of updating the frame, obtaining a panel temperature according to the temperature detection signal obtained from the temperature detection module by the timing controlling software;

according to the panel temperature, configuring voltages needed by the power supply module by looking up a voltage to temperature configuration table, configuring a chronological order of updating the frame by looking up a display order to temperature configuration table, and configuring a driver waveform suitable for updating the frame by looking up a driver waveform to temperature configuration table by the timing controlling software;

sending the voltage configuration command to the power supply module through an inter-integrated circuit ($I^2C$) by the timing controlling software;

sending display data to the scan driver and the data driver of the ChLCD panel by the timing controlling software for resetting the frame and displaying the new frame; and once finished displaying, returning the authority from the timing controlling software back to the OS by the timing controlling software.

17. The cholesteric liquid crystal display device as claimed in claim 16, wherein when returning the authority from the timing controlling software back to the OS, the timing controlling software also reports a display successful status back to the video software in the OS.

18. The cholesteric liquid crystal display device as claimed in claim 16, wherein the temperature detection signal is obtained from the temperature detection module through an I$^2$C by the timing controlling software.

19. The cholesteric liquid crystal display device as claimed in claim 16, wherein the timing controlling software sends the display data to the scan driver and the data driver of the ChLCD panel through a low voltage transistor-transistor logic (LVTTL) interface.

20. The cholesteric liquid crystal display device as claimed in claim 16, wherein the video software is a digital photo frame software or a digital signage software.

* * * * *